United States Patent [19]

Glista et al.

[11] 4,082,423
[45] Apr. 4, 1978

[54] FIBER OPTICS CABLE STRENGTHENING METHOD AND MEANS

[75] Inventors: Andrew S. Glista, Alexandria, Va.; Rodney S. Katz, Indianapolis, Ind.

[73] Assignee: The United States of America as represented by the Secretary of the Navy, Washington, D.C.

[21] Appl. No.: 715,815

[22] Filed: Aug. 19, 1976

[51] Int. Cl.² .................................. G02B 5/14
[52] U.S. Cl. ............................ 350/96.23; 174/70 R
[58] Field of Search ................ 350/96 B, 96 R; 174/70 R, 131 A; 156/608, DIG. 61

[56] References Cited

U.S. PATENT DOCUMENTS

| 3,227,032 | 1/1966 | Upton | 350/96 M |
| 3,471,266 | 10/1969 | La Belle, Jr. | 156/608 |
| 3,883,218 | 5/1975 | Slaughter | 350/96 B |
| 3,887,265 | 6/1975 | Margolis et al. | 350/96 B |
| 3,955,878 | 5/1976 | Nowak | 350/96 B |

FOREIGN PATENT DOCUMENTS

| 2,600,100 | 7/1976 | Germany | 350/96 B |
| 1,422,147 | 1/1976 | United Kingdom | 350/96 B |

OTHER PUBLICATIONS

Pollack, "Filamentary Sapphire, Part 2 Fracture Strength in Tension", J. of Materials Science 7, No. 6, 1972, pp. 649–653.

Primary Examiner—John K. Corbin
Assistant Examiner—Stewart Levy
Attorney, Agent, or Firm—R. S. Sciascia; L. I. Shrago; C. E. Vautrain, Jr.

[57] ABSTRACT

A non-metallic, high strength, high temperature resistant external or internal strengthening for fiber optics cables is provided. The strengthening may be in various forms such as internally deployed filaments, outer woven mesh fibers, segmented cylinders, helical wrap ribbon, etc., and is made from single high-strength crystal fibers preferably of sapphire, i.e. $\alpha$-$Al_2O_3$. The non-conductive strengthening crystals have a low density, are highly crush resistant and meet severe environmental fiber optic sensor and data transmission requirements.

26 Claims, 8 Drawing Figures

FIBER OPTICS CABLE STRENGTHENING METHOD AND MEANS

The present invention concerns strengthening fiber optics cables and, more particularly, accomplishing such strengthening by the addition of means strong enough to withstand maximum tensile loading and provide suitable crush protection without resultant fiber damage.

In the fiber optics field, a plurality of individual glass fibers or filaments are bundled together to form a light pipe or fiber optic array. The optical fibers used to produce such light pipes or arrays are necessarily flexible so as to be capable of curving to avoid obstacles and to conform to terrain so that they may extend to remote areas. Light pipes are or may be composed of glass or plastic materials, and in either case the individual fibers or filaments are composed of a central core having a selected index of refraction and an outer cladding or sheath which surrounds the core and has a lower index of refraction than that of the core. Because of the difference in index of refraction between core and cladding, light rays entering the core at one end of the fiber are retained within the core and propagate the length of the fiber by a succession of reflections at the core/cladding boundary and exit at the opposite end.

Glass fibers as freshly drawn are inherently very strong. Their initial strength may approach the ultimate tensile strength of the glass material, however, in any handling of these fibers the presence of surface contaminants and scratching, abrading or other physical damage of the surface results in a sharp lowering of the effective tensile strength of the glass fibers. The special requirements for strengthening the glass fibers of fiber optics cables have led to a number of constructions which add strength members in order to provide the ultimate required strength. Because metal strength members are not desirable, and are often unacceptable, non-conducting textiles have been the principal material used for strengthening the cable construction. In order to achieve suitable strengthening, however, the cables should be able to withstand both short-term loading stresses due to installation procedures and long-term loading stresses in which service conditions require continuous tensile loading.

Short-term loading can be somewhat controlled by specific and supervised assembly and installation procedures. That is, there is an opportunity to perform tests after installation such as a continuity test which would indicate fiber breakage. In this instance there is thus an opportunity to replace the deflective cable prior to installation.

In long-term stress loading, however, it is desirable in order to avoid static fatique failure that the glass fibers may remain unstressed or very lightly stressed, with the long-term stress as small a portion of the initial rupture stress as it is possible to achieve.

Sapphire filaments or other single crystal filaments having commensurate properties possess a unique combination of qualities which the present invention utilizes in strengthening fiber optics cables. The most important of the qualities are that the sapphire filament is dielectric and, therefore, is appropriate for maximum electrical isolation, that the sapphire filament has a much higher modulus, i.e. ratio of stress to strain, than the glass fibers so that it can realize its total strength capability with little elongation to protect the brittle glass fibers, and that the sapphire filaments have a high value of bending modulus, i.e. they are stiffer than a glass fiber of the same crosssectional area in bending, which allows the use of small diameter sapphire filaments to provide bending restriction as well as tensile strength.

Some bending restriction is necessary to insure that glass fibers in fiber optics bundles do not bend beyond their minimum allowable (for fracture) bend radius. Textile and other dielectric strength members such as Kevlar which are conventionally employed to protect glass fibers do not generally provide sufficient restriction to bending and, if an appropriate strength member is to be constructed of these materials, they must be applied as an overall braid sheathing which is designed to provide the necessary bending restriction. In addition to these disadvantages, textiles in a longitudinal lay, i.e. parallel to the cable axis, tend to kink in bending and are, therefore, difficult to employ for the purpose of protecting glass fibers. The present invention is directed toward providing the necessary protection for glass fibers by strengthening fiber optics cables through the addition of sapphire single crystal elements in and/or about the cables.

Accordingly, it is an object of the present invention to provide non-conductive strengthening of fiber optics bundles by single crystal elements which can withstand high temperatures and high tensile stresses and provide controlled flexibility.

Another object of this invention is to provide a strength member for fiber optics bundles that is made of non-conductive material which may be formed into filaments, ribbons, cylinders, etc. so as to meet severe environmental fiber optic sensor and data transmission requirements.

A further object of this invention is to provide temperature and strength protection for the glass fibers of fiber optics cables which protects the glass fibers from continuous tensile loading and thereby inhibits static fatigue failure.

Other objects advantages and novel features of the invention will become apparent from the following detailed description thereof when considered in conjunction with the accompanying drawings in which like numerals represent like parts throughout and wherein.

The present invention, in general, concerns a non-metallic, high strength, high temperature resistant internal or external strengthening means for fiber optics bundles wherein the strengthening means preferably is made of single crystals of non-conductive material such as sapphire. These single crystal members are highly crush resistant and flexible so as to permit their use in severe environments for fiber optic sensor and data transmission requirements. The single crystals may be formed in a variety of shapes and may be inserted within a fiber optics bundle or isolated from a fiber optics bundle in an extruded cable embedment material such as urethane or other suitable material or formed as a jacket about a fiber optics bundle to provide additional strength. In the jacketing embodiment, the single fiber filaments may be applied in various forms such as a woven mesh of fibers, segmented cylinders, ribbons, etc. The single crystal fibers, segmented cylinders, ribbons, etc, may be grown from a melt of α-alumina, i.e. $Al_2O_3$ in crystalline form, in processes such as that described in U.S. Pat. No. 3,471,266 for Growth of Inorganic Filaments issued Oct. 7, 1969 to Harold E. LaBelle, Jr.

Figure 1:
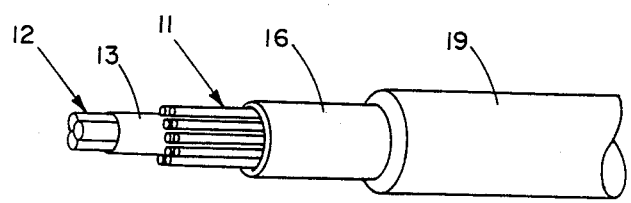
FIG. 1 is an isometric view of a fiber optic bundle having centrally located strength members and encased in extruded outer jackets.

Referring to the drawings, FIG. 1 illustrates one embodiment of a bundle of glass optical fibers 11 strengthened by sapphire filaments. In this construction, a plurality of preferably plastic coated sapphire filaments 12 are centrally located in the bundle and are covered with an extruded plastic jacket 13. In volume production, this construction of central core strength member can be prepared and spooled prior to the final cabling operations. Glass fibers 11 can then be served together with the central strengthening core into an extruder to apply a second extruded jacket 16. The bundled optical fibers are thus free to move in jacket 16. Fiber contact is made with the compliant plastic coating of sapphire filaments 12 and the walls of jacket 13 so that no fiber abrasion will occur. An extruded outer jacket 19 is then formed to provide outer mechanical and environmental protection. Sapphire strength members 12, being contained within the bundle of optical fibers 11, can be terminated in a simple fashion with both glass and sapphire elements set together within a single terminating ferrule, not shown, by means of an epoxy adhesive matrix. Therefore, there is no need for a separate termination to secure mechanical contact to strength members which would be required if the strength members were external to the optical fiber core.

Figure 2:
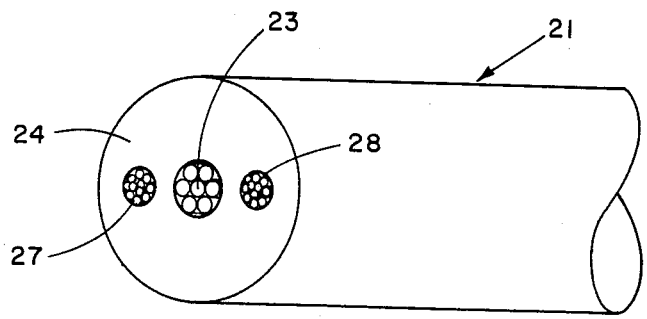
FIG. 2 is a perspective view of a single extrusion cable construction wherein the glass optical fibers are isolated from the strength members.

FIG. 2 illustrates a single extrusion cable embodiment 21 wherein a bundle of glass fibers 23 is centrally located in an extruded cable embedment material 24 such as urethane. The sapphire or other single crystal filament strength members in this embodiment are spaced from bundle 23 and as indicated at 27 and 28 include bundles of small diameter filaments to provide flexibility and of a number which is determined by the tensile strength required of the cable. The cable of FIG. 2 will bend only in the plane of the sapphire filaments. This embodiment can be fabricated inexpensively with only a single extrusion required.

Figure 3:
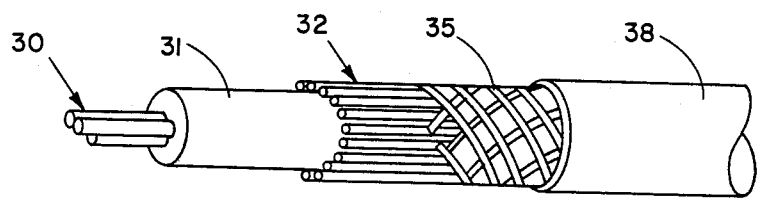
FIG. 3 is an isometric view of a fiber optics bundle construction having both longitudinal and helical braided strength members.

In FIG. 3, a cable strengthening embodiment having both longitudinal and helical braid strength members is shown. A plurality of glass fibers 30 are centrally positioned in a primary protective extrusion 31 which may be of thermoplastic material or silicone rubber or other suitable material. On the outer surface of extrusion 31 are a plurality of sapphire filaments 32 longitudinally deployed around the extrusion periphery. The sapphire filaments preferably are individually coated with plastic for abrasion protection and to improve performance. A helical braid 35 is placed over the longitudinal layer of filaments, the braid serving to hold the longitudinal member in place while providing additional strength and assuring more uniform bending without kinking. Braid 35 may be made of either very fine plastic coated single crystal filaments or a textile fiber such as high strength Kevlar or dacron polyester. An enclosing protective extrusion 38 completes the composite construction and also may be made of thermoplastic or silicone rubber. The filaments 32 in this embodiment are uniformly spaced about extrusion 31 so that a relatively large number of small diameter filaments can be placed to achieve both the flexibility and strength required. An outer extruded layer 38 is provided, as before, for added environmental and physical protection.

Figure 4:
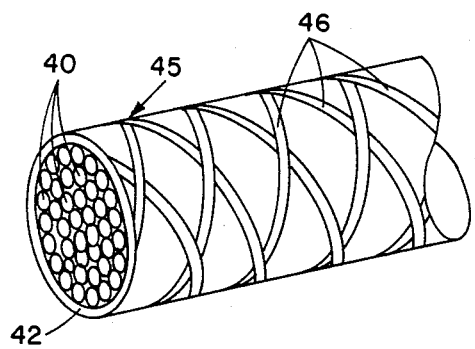
FIG. 4 is an isometric view of a fiber optics bundle having a woven sheathing made of selected crystal material.
Figure 5:
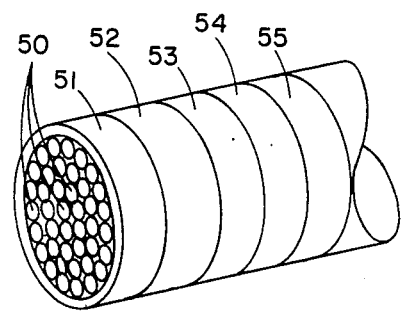
FIG. 5 is an isometric view of an alternate configuration of sheathing made of the same material as the sheathing of FIG. 4.
Figure 6:
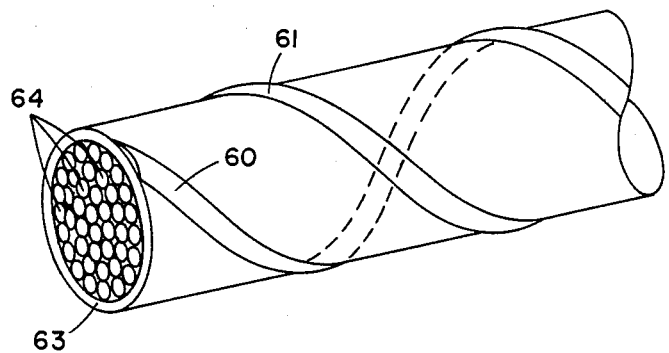
FIG. 6 is an isometric view of a further embodiment of sheathing configuration made of the same material as the sheathing of FIGS. 4 and 5.
Figure 7:
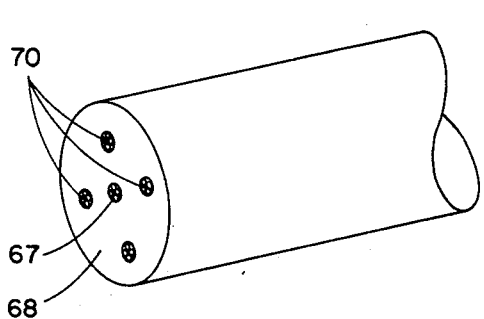
FIG. 7 is an isometric view of an embodiment having centrally positioned strength members and radially spaced optical fibers.
Figure 8:
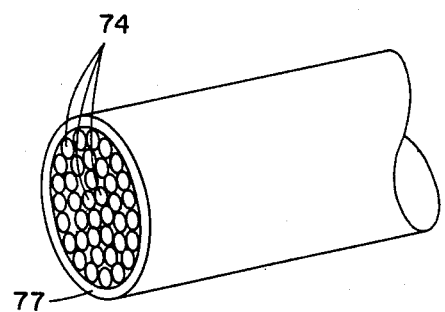
FIG. 8 is an isometric view of an embodiment having combined strength and optical single crystal filaments enclosed in a protective sheathing.

FIG. 4 illustrates a bundle of individual glass fibers indicated at 40 which may be held together by a thin skin or film 42 with the bundle and film protected by an outer mesh 45 which is formed of a plurality of single crystal fibers 46 woven together to form a self-tightening sheathing. Only a small number of crystal fibers are shown for clarity, however, it will be appreciated that much more dense weaves would be required in most environments to provide the desired high temperature and high tensile strength armoring. In the embodiment of FIG. 5 a plurality of glass fibers 50 are shown encased in a series of single crystal segmented cylinders 51-55 which may be grown in conventional manner and passed over and assembled upon the bundle of glass optical fibers. This form of casing produces an essentially rigid cable. In FIG. 6 an alternate form of strengthening is shown wherein only a small number of relatively large filaments such as ribbons 60 and 61 are employed to provide the desired protection. It will be appreciated that additional such ribbons covering substantially the entire outer surface of an underlying preferably loose fitting tubular jacket 63 which surrounds a bundle of glass optical fibers 64 may be used in this embodiment of the invention. FIG. 7 shows an alternate extruded cable embodiment wherein a bundle 67 of filaments preferably on the order of from 0.001 inch to 0.010 inch in diameter of sapphire or other single crystal material is centrally disposed in a cable embedment material 68 such as urethane with a plurality of bundles of glass optical fibers 70 radially disposed in embedment material 68 remote from filament bundle 67. The lower limit of this range is established by handling and fabrication restrictions and the upper limit by flexibility considerations. FIG. 8 is a composite singly sheathed embodiment wherein all of the filaments or fibers indicated at 74 are single crystal filaments contained within an outer organic or inorganic sheathing 77 which may be made of thermoplastic or silicone rubber. In this construction the single crystal filaments serve as both the light transmission media and as strength members.

The strengthening of fiber optics bundles by the methods and means disclosed herein is applicable to single fiber cable constructions, i.e. where a single fiber is used as a separate data channel, as well as to multiple fiber cable constructions, i.e. where a number of jacketed single fibers are contained within a single cable construction such as 11, 23, 30, 40, 50, 64 and 70 in FIGS. 1-7, respectively. Sapphire or other single crystal filaments may be used as the actual light guides as are filaments 74 in FIG. 8. For this use, the filaments preferably are first flame polished to increase overall strength and provide a smooth outer surface before being treated or clad with an outer layer having a lower index of refraction than the crystal core. A cladding layer of a suitable fluoropolymer such as Tefzel would provide a typical index of refraction of $\eta = 1.40$ and produce a light guide with a high numeric aperture. A crystal filament clad with $SiO_2$ would have both a high numeric aperture and superior radiation resistance properties. A further embodiment would include a single bundle of fibers/filaments with the sapphire or other single crystal filaments centrally positioned in the bundle and the glass optical fibers symmetrically disposed thereabout.

Single crystal sapphire elements such as the filaments, ribbons and/or collars used in the various embodiments depicted and described herein may be grown from a melt by vapor, hydrothermal and/or flux/solvent techniques. Recent advances in technique have enabled the production of filaments as small as 1.5 mils in diameter with nonfaceted surfaces and free from easily detectable subgrain boundaries. Filaments 10 mils in diameter have been produced in lengths of several hundred feet, while refinements in profile controlling means have led to the growth of single crystal sapphire tubes up to 1 inch in diameter, ribbons 1 inch wide and up to 4 feet long, and more complex shapes. The preferred technique for achieving the shaped crystals other than filaments involves the use of a floating shield and orifice in a crucible/tungsten rod apparatus. This technique has been extended to include the growth of a number of other crystalline materials including BeO, $LiNbO_3$, LiF, $BaTiO_3$, $C\mu$-$A\mu$ solid solutions, NaCl, $MgAl_2O_4$ and others. $LiNbO_3$ in particular has been grown as single-crystal single-domain ribbons ¼ inch wide by over 21 inches long.

The use of single crystal sapphire elements provides for chemically inert, high modulus of elasticity, low density and potentially high tensile strength, both at room and elevated temperatures, strengthening members for glass optical fibers. The high sapphire dielectric strength makes it excellent for use in epoxy composites in instances where electromagnetic radiation transparency is essential such as in radomes. The strength of single crystal sapphire filaments is essentially the same as that of other high modulus filamentary materials commercially available such as boron and silicon carbide. The process is also available to a wide range of other crystalline materials, as indicated supra, including some non-congruently melting ones. The techniques are believed to be applicable to the growth of ribbons of silicone and other semiconductors.

The present invention provides a substantial increase in strength in fiber optics bundles by the addition thereto of sapphire or other single crystal strength members which maintain nearly their initial strength for long periods of time in relation to glass fibers. That is, the sapphire or other single crystal members exhibit to a lesser degree the principal failure mechanism of glass fibers which is a surface effect wherein their tensile strength is continuously degraded by the propagation and extended development of surface microflaws. Stress, high temperatures, high humidity, thermal shock, abrading of fibers by neighbors within a bundle and by contact with the bundle sheathing, particularly at pressure points, all contribute to degradation of the surface and a resultant lowered tensile strength.

In the embodiments of the invention which include a sheathing, the sheathing is made loose fitting and preferably of thermoplastic material so as to avoid undue stress on the glass optical fibers. By adding single crystal filaments to the optics cable it is believed that upon tensile loading all single crystal filament elements are stretched taut, with stress thereby transferred to the sapphire or other single crystal filaments in proportion to their high modulus of elasticity.

Multi-bundle cables such as that in the embodiment of FIG. 7 are inherently stronger than single bundle embodiments because more filaments are available to share the loading. Thus, the tensile loading capability of a four-bundle cable can be substantially four times that of a single bundle. Sapphire filaments or even a single filament can be cabled together with optical bundles. Where the filaments are shorter in length than the bundles, the filaments can be terminated on the connector back shell to provide complete stress relief for the optical fibers. For equal loading, the filaments should be distributed substantially uniformly around the periphery of the cable as shown in FIG. 3.

Where sapphire or other single crystal filaments are used as light guides as in FIG. 8, the filaments must exhibit very low impurity concentrations in order to preserve the crystalline structure to an extent that defect formation does not limit strength properties and so that optical attenuation is low. The sapphire filaments also should first be flame polished to both increase overall strength and provide a smooth outer surface. The surface is then treated or coated to produce a fiber with a sapphire core and a concentric outer cladding layer of lower index of refraction than the core. These sapphire filaments/fibers can be used in single fiber, multiple fiber and fiber bundle cable configurations in the same manner as glass fibers.

What is claimed is:

1. An electrically non-conductive strengthening means for glass fiber optics bundles or other similar fiber cables capable of withstanding installation stresses as well as continuous tensile loading during service comprising:
    a plurality of light energy-conducting fibers bundled together in side-by-side substantially parallel relationship with each other; and
    a protective binding about said bundle comprised of individual single crystal members of a compound having a high modulus of elasticity, low density and high tensile strength at environmental and substantially higher than environmental temperatures.

2. The strengthening means of claim 1 wherein said fibers are made of glass and said single crystal members are filaments made of an electrically non-conductive compound having little elongation at its total strength and a high value of bending modulus so as to form a bending restriction which protects said glass fibers.

3. The strengthening means of claim 2 wherein said filaments are made of sapphire.

4. The strengthening means of claim 2 wherein said cables include an embedment material and said fibers and said filaments are contained therein,
    said fibers being centrally disposed in said embedment material,
    said filaments being grouped in at least two bundles disposed about and spaced from said fibers in said embedment material.

5. The strengthening means of claim 4 wherein said filaments are made of sapphire.

6. The strengthening means of claim 2 wherein said cables include a jacket of resilient electrically non-conductive material surrounding said fibers, said filaments being annularly disposed about said resilient material;

an inner sheath of resilient electrically non-conductive material disposed over said filaments for holding said filaments in place and providing more uniform bending; and an outer sheath of resilient electrically non-conductive material enclosing said inner sheath for containing and protecting said fibers, said jacket, said filaments, and said inner sheath.

7. The strengthening means of claim 6 wherein said filaments are made of sapphire.

8. The strengthening means of claim 2 wherein said fibers are held together by an annular film of resilient electrically non-conductive material and said filaments are wound about said resilient material to form a self-tightening sheathing.

9. The strengthening means of claim 8 wherein said filaments are made of sapphire.

10. The strengthening means of claim 2 wherein said fibers are held together by an annular film of resilient electrically non-conductive material and said filaments are in the form of ribbons which are wound about said resilient material.

11. The strengthening means of claim 10 wherein said filaments are made of sapphire.

12. A composite construction of fiber optics bundles comprising: light energy conducting means and protective means, one of said means being single crystal members of a compound having a high modulus of elasticity, low density and high tensile strength at high temperatures generally encountered, and the other of said means forming the remainder of the fiber optics bundle.

13. The composite construction of claim 12 wherein said energy conducting means form a plurality of centrally disposed conductive elements and said protective means is a cladding about said elements.

14. The composite construction of claim 13 wherein said central elements are single crystals of sapphire and said cladding is glass.

15. The composite construction of claim 12 wherein said energy conducting means is a plurality of glass fibers and said protective means is a plurality of sapphire filaments symmetrically distributed with respect to said glass fibers; and a sheathing of electrically non-conductive resilient material containing and shielding said fibers and filaments.

16. The composite construction of claim 12 wherein said energy conducting means is a plurality of glass fibers and said protective means is a plurality of adjacent close-fitting collars longitudinally enclosing said fibers, each of said collars being a single crystal of sapphire.

17. The composite construction of claim 12 wherein said energy conducting means is a plurality of glass fibers bundled in side-by-side substantially parallel relationship with each other and said protective means is a binding about said bundle of fibers comprised of individual single crystals of sapphire.

18. The composite construction of claim 17 and further including an annular film of resilient electrically non-conductive material longitudinally enclosing said fibers, said filaments wound about said resilient material to form a self-tightening sheathing.

19. The composite construction of claim 12 wherein said protective means is a plurality of single crystal sapphire filaments;

a jacket of resilient electrically non-conductive material longitudinally enclosing said filaments, said energy conductive means being a plurality of glass fibers circumferentially disposed about said jacket; and jacketing means of resilient electrically non-conductive material longitudinally enclosing said fibers.

20. The composite construction of claim 12 wherein said energy conductive means is a plurality of glass fibers;

a cable embedment material and said fibers centrally embedded therein during extrusion thereof, said protective means including a plurality of single crystal sapphire filaments, said filaments assembled in at least two bundles and said bundles spaced from said fibers in said embedment material.

21. The composite construction of claim 12 wherein said protective means is a plurality of single crystal sapphire filaments;

a cable embedment material and said filaments centrally embedded therein during extrusion thereof, said energy conductive means being a plurality of glass fibers, said fibers assembled in at least two bundles and said bundles spaced from said filaments in said embedment material.

22. The composite construction of claim 12 wherein said energy conductive means is a plurality of glass fibers;

a cable embedment material and said fibers centrally embedded therein, said protective means being a plurality of single crystal sapphire filaments circumferentially disposed about said embedment material;

strengthening means of woven single crystal sapphire filaments disposed about said circumferentially disposed filaments; and jacketing means of resilient electrically non-conductive material longitudinally enclosing said strengthening means.

23. A method of protecting fiber optics bundles comprising:

enclosing a bundle of light energy conductive glass fibers in a loose fitting tubular jacket and encircling said jacket with a protective means comprised of single crystal members of a compound having a high modulus of elasticity, low density and high tensile strength at high temperatures generally encountered.

24. The method of claim 23 wherein said members are single crystal filaments of sapphire entwined about said jacket.

25. A method of protecting fiber optics bundles comprising embedding separate bundles of glass fibers and single crystal filaments of a compound having a high modulus of elasticity, low density and high tensile strength at high temperatures generally encountered in a flexible electrically non-conductive cable embedment material.

26. The method of claim 25 wherein said filaments are made of sapphire.

* * * * *